Dec. 24, 1940.      R. B. McKINNIS      2,226,513
METHOD OF EXTRACTING FRUIT AND VEGETABLE JUICES
Filed Aug. 11, 1938      10 Sheets-Sheet 1

INVENTOR.
Ronald B. McKinnis
BY Shreve, Crow & Gordon
ATTORNEY.

Dec. 24, 1940.     R. B. McKINNIS     2,226,513
METHOD OF EXTRACTING FRUIT AND VEGETABLE JUICES
Filed Aug. 11, 1938     10 Sheets-Sheet 3

INVENTOR.
Ronald B. McKinnis
Shoemaker, Craig & Gordon
ATTORNEY.

Dec. 24, 1940.  R. B. McKINNIS  2,226,513
METHOD OF EXTRACTING FRUIT AND VEGETABLE JUICES
Filed Aug. 11, 1938  10 Sheets-Sheet 5

INVENTOR.
Ronald B. McKinnis
BY
Theron Crane Gordon
ATTORNEY.

Dec. 24, 1940.   R. B. McKINNIS   2,226,513
METHOD OF EXTRACTING FRUIT AND VEGETABLE JUICES
Filed Aug. 11, 1938   10 Sheets-Sheet 8

FIG.26

INVENTOR.
Ronald B. McKinnis
BY
Shreve, Crow & Gordon
ATTORNEY.

Dec. 24, 1940.  R. B. McKINNIS  2,226,513
METHOD OF EXTRACTING FRUIT AND VEGETABLE JUICES
Filed Aug. 11, 1938  10 Sheets-Sheet 9

INVENTOR.
Ronald B. McKinnis
BY
Shreve, Craw & Gordon
ATTORNEY.

Patented Dec. 24, 1940

2,226,513

UNITED STATES PATENT OFFICE 2,226,513

METHOD OF EXTRACTING FRUIT AND VEGETABLE JUICES

Ronald B. McKinnis, Highlands City, Fla., assignor to Sunshine Foods Inc., Winter Haven, Fla., a corporation of Florida Application August 11, 1938, Serial No. 224,388

12 Claims. (Cl. 99—155)

Generically this invention relates to the extraction of fruit and vegetable juices, but more especially it is directed to a method for extracting citrus and other juices under conditions which will maintain their original bacteriological characteristics, vitamin content and natural flavor.

Experience in this art has demonstrated, when fruit and vegetable juices are extracted in the presence of oxygen, some of their vitamin content is destroyed, and, therefore, one of the principal objects of this invention is the provision of a method and apparatus for effecting the extraction of the juice in the presence of an inert gas and in such a manner as to preserve its original aroma and anaerobic condition and to conserve the antiophthalmic, antineurotic, antiscorbutic, and antipellagric vitamins, which are dietetically important to bodily development and resistance to disease, and which would otherwise be lost.

One of the principal objects of this invention is the provision of means for producing citrus and other juices substantially free from contact with free oxygen and with their natural sterility maintained, and providing particular means for keeping the fruit juices in substantially their normal anaerobic condition while being separated from the non-juice portions of the fruit.

Another important object of this invention is the provision of a reliable, simple and effective method and apparatus for producing fruit juice uncontaminated by air or micro-organisms, and in such condition that said juice can be used for preserving in sealed containers, for the making of concentrates, frozen juice, or for other purposes that such freedom from contamination would render desirable.

A further important object of this invention is the provision of an air-tight chamber adapted to house the juice extractor mechanism having an air seal delivery means through which the fruit is conveyed to the extractor mechanism, and an air seal discharge means through which the portions of the fruit from which the juice has been extracted are discharged from the apparatus.

Another important object of this invention is the provision of an apparatus including an airtight chamber housing the fruit extractor mechanism, a fluid air seal through which the fruit is delivered to the extractor mechanism, a similar fluid air seal through which the waste after extraction is discharged from the apparatus, means for establishing by an inert gas an oxygen free atmosphere in the apparatus intermediate said fluid air seals and in the presence of which the juice is extracted and delivered to sealed containers in its natural anaerobic condition.

A still further important object of this invention is the provision of an air-tight fluid sealed apparatus for housing and sealing from the surrounding atmosphere a juice extracting mechanism, means for filling the apparatus with a sterilizing fluid, displacing the fluid with a non-oxidizing gas under pressure, delivering the fruit to the oxygen free atmosphere within the apparatus through a sterilizing medium constituting a fluid air seal, extracting the juice under oxygen free conditions, discharging the juice freed portions of the fruit from the apparatus through a similar fluid air seal, and collecting the extracted juice in suitable oxygen free containers.

Another object of this invention is the provision of a method and apparatus including an airtight section housing the juice extractor drum assemblies carrying the fruit cup and hull ejector mechanisms, a fluid air seal conveyor section at each end of said apparatus, the latter initially adapted to be completely filled with a sterilizing fluid, said fluid being displaced intermediate said seals with an inert gas maintained therein at a pressure slightly above atmosphere, and independent means in connection with said drums operable during said fluid filling and emptying operations to fill said drum assemblies with the inert gas so as to force out all air and prevent the entrance of water therein through the ejector operating openings of those in extended position, said means being inoperable during the normal operation of the apparatus.

With these and other objects in view, which will become apparent as the description proceeds, the invention resides in the construction, combination and arrangement of parts, hereinafter more fully described and claimed, and illustrated in the accompanying drawings, in which like characters of reference indicate like parts throughout the several figures, of which:

This invention, while primarily applicable to the extraction of juice from the citrus fruits such as oranges, grapefruit, lemons, limes, tangerines, tangelos, etc., may be employed with equal facility for extracting the juice from peaches, apples, celery, carrots, grapes, tomatoes, and the like.

Normally the juices from these fruits and vegetables deteriorate and lose their food value by virtue of the action of certain micro-organisms; by oxidation of their essential oils, esters, aldehydes, etc., and by the inclusion of alkaloids, glucosides and oil from the pulp or outer peel; and to overcome the preceding bacteriological and chemical effects, by providing an air-tight chamber housing the extractor cup drum and ejector assemblies having a fluid air seal delivery conveyor structure at one end of the apparatus and a discharge fluid seal conveyor structure at the other, and a combined fluid supply, air venting and overflow unit connected with each conveyor structure, whereby the apparatus is initially filled with a sterilizing fluid forcing out all air, then as the fluid is replaced filling such space intermediate the end fluid seals with an inert gas, and additional means for forcing out all air from the extractor cup drum assemblies through the openings surrounding the ejector mechanisms and preventing the entrance of water therethrough during the filling and emptying operations, and upon completion of such operations the device intermediate the end fluid seals is filled with an oxygen free inert gas and whereby the outer surface of the fruit after it enters the apparatus is first sterilized and then delivered to the extracting mechanism within the gas filled chamber without chance of contamination and in which oxygen free atmosphere the juice is extracted and delivered to oxygen free containers for subsequent consumption without impairment of its natural flavor and original vitamin content, I evolved the method and apparatus forming the subject matter of this invention.

Before proceeding further with the discussion of this invention, it is deemed advisable to state at this point that this invention, although primarily designed for the extraction of juice from citrus fruits, may be advantageously employed for the extraction of juices from other fruits and vegetables, hence, for the sake of convenience and to avoid repetition, it is to be understood that wherever in the specification and claims reference is made to "fruit" this expression is to be construed as embracing fruit, vegetables, and the like.

In the illustrated embodiment characterizing this invention there is shown a citrus fruit juice extracting apparatus A, comprising a fruit juice extractor unit B, a fluid seal conveyor unit C for delivering the fruit to unit B, a substantially similar fluid seal peel or hull conveyor D for delivering portions of the fruit from which the juice has been extracted from the apparatus, and a horizontal hull conveyor E communicating with conveyor unit D adapted to receive the portions of the fruit from which the juice has been extracted directly from the extractor B and convey them to said unit D.

There are a number of different mechanisms already in use for actually extracting the juice from the fruit which may be employed in unit B, such, for instance, as the type covered by Patents Nos. 1,888,528 and 1,888,529. However, these are more or less open to the atmosphere, and it is applicant's purpose in carrying out his method to effect extraction of the juice from the fruit in an air tight gas filled chamber and which he accomplishes by either encasing a device such as shown in said patents to Faulds, or other like devices, by forming an air tight chamber surrounding the extracting mechanism or by placing said mechanism in an air tight chamber included in his improved apparatus having proper delivery and discharge fluid air seal mechanisms communicating with said chamber, as will hereinafter more fully appear.

*Juice extractor mechanism*

What may be termed the central unit of apparatus A, or the fruit juice extractor unit B, in the present instance (Figs. 9 and 11) comprises a pair of upright frame standards 1 on one side and a similar pair 2 on the opposite side of the machine, said pairs of standards 1 and 2 having upwardly and inwardly extending sections 3 suitably connected at their top edges, said inclined sections 3 being connected by parallel sections 4. The upper ends of the respective standards 1 and 2 are connected by the horizontal side members 5, and substantially central of their length by horizontal members 6, and at the ends of the machine frame members 1 and 2 are connected in substantially the same horizontal plane as members 5 by frame members 5', and in the same plane as members 6 by cross bars 7. The lower ends of said frame members may be suitably connected by the diagonal brace members 8. The frame work just described is adapted to suitably support the juice extractor mechanisms including series of cups radially carried by the rotatable shaft assemblies 9' and 10' mounted in horizontal members 5. The juice collecting pan 11 has drain pipe 12 in the elbow of which is mounted a two-way cut off valve 12' which is also connected to juice pipe 13' leading to juice pump or suitable container (not shown). Said juice pan 11 is supported on casings 13 (Fig. 26) suitably supported on cross bars 6 and adapted to house the plunger and presser head mechanisms adapted to cooperate with the respective fruit carrying cups to extract the juice from the fruit carried thereby, said plunger and presser head mechanism being driven by motor M and which construction is included in the Faulds machine, and is not shown here in detail, since it forms no part of the present invention. In said Faulds machine the space above the horizontal members 5 and intermediate said members and the juice collecting pan 11 is not enclosed so that in such machine the juice is not extracted in an atmosphere free of oxygen and, since in applicant's method it is essential that the juice be extracted in an oxygen free atmosphere, it was necessary in order to adapt said machine to applicant's purpose that its upper portion be encased to form an air tight chamber surrounding the extracting mechanisms, and which construction will now be described.

The respective open spaces above horizontal members 5 are enclosed by upper side plates 14 and inclined end cover plate 15, the underlying frame pieces being threadedly tapped to receive the fastening elements 16 extending through suitable openings in said plates and through the gaskets 17 on which said plates seat to effect an air tight seal, as will hereinafter more fully appear.

Figures 4, 5, 6, 7:
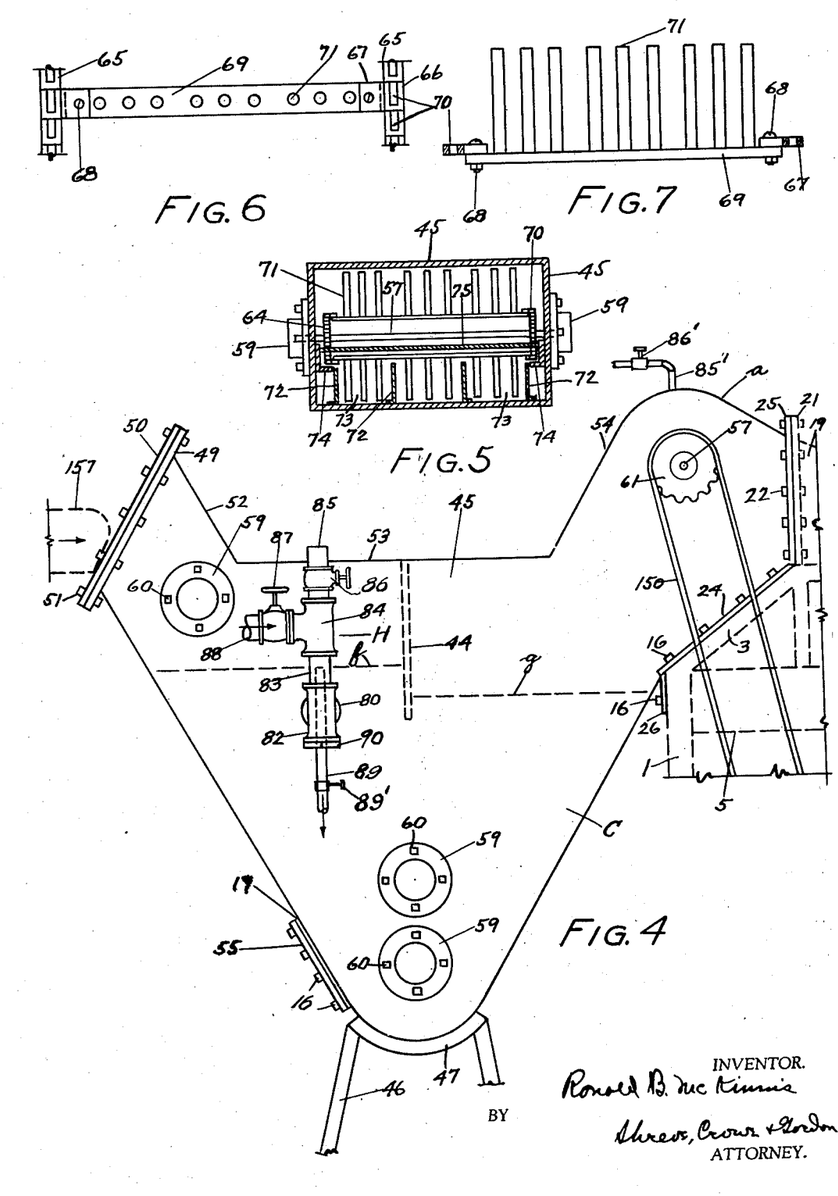
Fig. 4 is a side elevation of the delivery conveyor and the fluid supply, venting and overflow unit.
Fig. 5 is a cross section taken on the line 5—5 of Fig. 2.
Fig. 6 is a top plan view of one of the separator members, conveyor fingers, and portions of the endless conveyor chains.
Fig. 7 is a side elevation of Fig. 6 with the separator attaching links of the endless chain partly in section.
Figure 8:
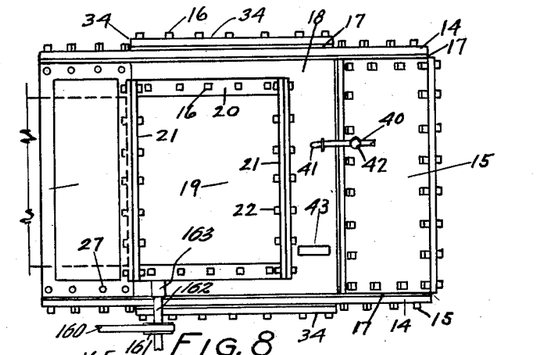
Fig. 8 is a top plan view of Fig. 9.
Figure 12:
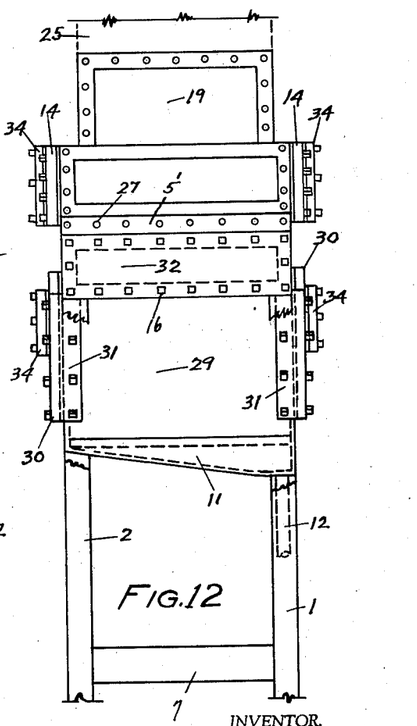
Fig. 12 is a fragmentary left end view of Fig. 11.

The opening in the top 18 (Fig. 8) of the extraction unit B overlying the point of delivery of the fruit to the fruit carrying cup mechanism and stationary knife structure (not shown) is closed by hood section 19 attached along its edges with horizontal flanges 20 by fastening elements 16 and at its ends by vertical flanges 21. The flange 21 at the smaller end of hood 19 (Fig. 9) corresponds with and is secured by fastening elements 22 to the similar flange 23 suitably connected to top 18. The fruit discharge end a of the fluid seal delivery conveyor C (Fig. 2) extends downwardly and outwardly on opposite sides terminating in flanges 24 secured to frame sections 3 by fastening elements 16, and terminates at its end in a complemental vertical flange 25 similar to the larger flange 21 of hood 19 to which it is connected by fastening elements 22. At the lower end of flanges 24 said supply fluid seal conveyor structure C is suitably formed with a transverse depending flange 26 connected to frame member 5' by fastening elements 16 suitably engaging the tapped holes 27 in said member 5' (Figs. 4 and 12).

At this point it might be well to state that all parts such as the cover plates 14, inclined plates 15, and flanges 22, 23, 25, etc. forming a portion of the casing surrounding the underlying frame work of the extractor section B are adapted to seat on suitable gaskets 17 and which for brevity of description may not be referred to in each instance as the description proceeds.

Figures 9, 10:
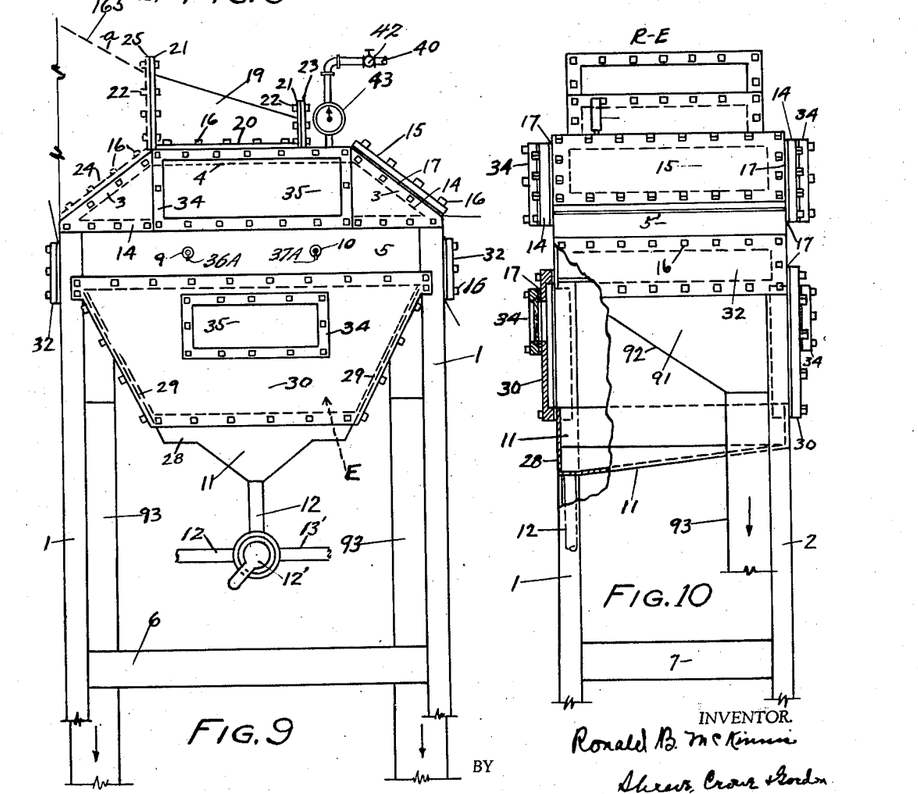
Fig. 9 is a fragmentary front side elevation of the central or extractor unit showing the encasing cover plates and windows.
Fig. 10 is a fragmentary right end view of Fig. 9 with parts broken away and partly in section.
Figure 11:
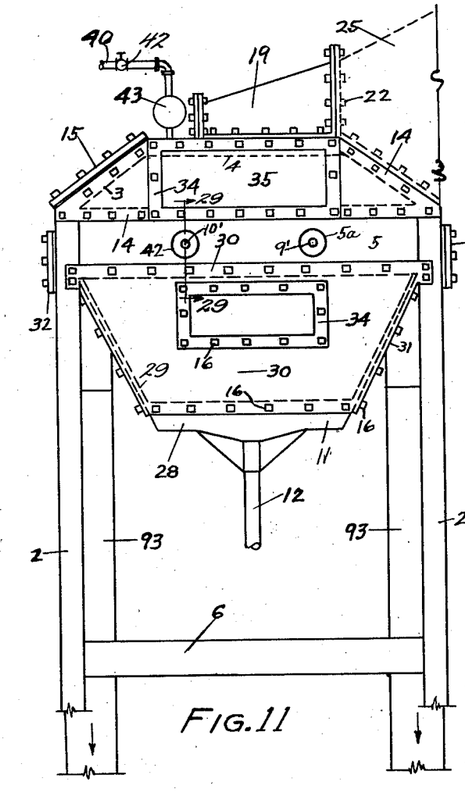
Fig. 11 is a fragmentary rear side elevation of Fig. 9 showing the drive shafts and sprockets for the rotatable fruit cup drum and shaft assemblies.

The fruit juice collecting pan 11 comprises low front and rear walls 28 and high outwardly inclined walls 29 (Figs. 9 and 11). Said pan 11 is adapted to constitute the bottom of the air tight fruit juice extracting chamber when the upper portion of the extractor unit B has been completely encased. The side openings intermediate the walls 28 and sections 5 are closed by the lower side cover plates 30, connected at their upper edges to members 5 and standards 1—1 and 2—2 and at their lower edges to walls 28 by fastening elements 16. The end edges of said plates 30 are formed with lateral flanges 31 (Fig. 12) adapted to overlie the inclined walls or sides 29 of juice pan 11 to which they are secured by fastening elements 16, as will be well understood.

The spaces between the upper edges of sides 29 and frame members 5' (Figs. 10 and 12) are closed by end cover plates 32 secured to said members and standards 1 and 2 by fastening elements 16.

Figure 13:
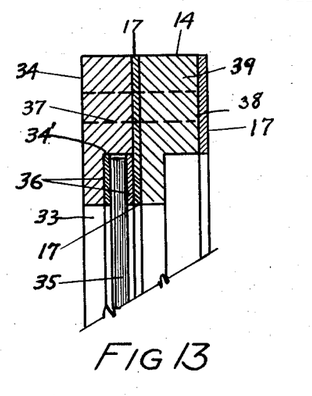
Fig. 13 is a detail fragmentary sectional view of one of the windows.
Figure 14:
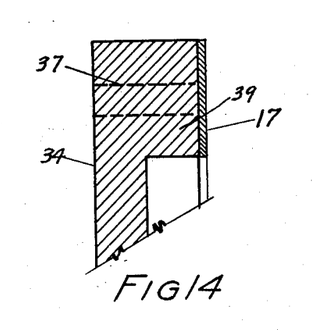
Fig. 14 is a detail fragmentary sectional view of the edge construction of one of the cover plates.

The respective cover plates 14 and 30 are provided with window openings 33, each of which is adapted to be sealed by a window frame 34 (Figs. 13 and 14) countersunk surrounding its inner edge as at 34' to receive the edges of a sight glass or other transparent pane 35 on each side of which is positioned a gasket 36, a gasket 17 being interposed between the frame 34 and cover plate 14 or 30 to which said frame is connected by fastening elements 16 extending through the registering openings 37 and 38, the outermost gasket 17 seating on the underlying frame work. It will be noted that preferably the cover plates, as shown in Figs. 13 and 14 with respect to plates 14 and 32, are thickened at their connecting edges as at 39.

The encasement of the upper end of the extractor unit B is now completed and which forms the air tight chamber E surrounding the fruit juice extracting mechanism. At this point it might be well to state, and as hereinafter will be more fully explained, that initially said fruit juice extractor chamber is filled with hot water or other sterilizing fluid to an extent that all air is forced out, and then the fluid is displaced with a non-oxidizing agent, in the present instance an inert gas such as carbon dioxide or nitrogen, which is admitted to said chamber from a source of supply through a supply line 40 (Figs. 8 and 9) suitably extending through top 18 as at 41 for communication with said chamber and having mounted therein a suitable control valve 42. Also communicating with said chamber and suitably mounted in top 18 is the pressure gauge 43.

The air tight chamber E just described is adapted to house said juice extractor mechanisms including the respective shaft and drum assemblies constituting mountings for the radially extending fruit cups and ejector mechanisms, said shaft and drum assemblies including the inner fixed shafts 9 and 10 at one end (Figs. 9 and 26), and the rotatable drive shafts 9' and 10' (Figs. 11 and 27) at the other end.

Figures 28, 29:
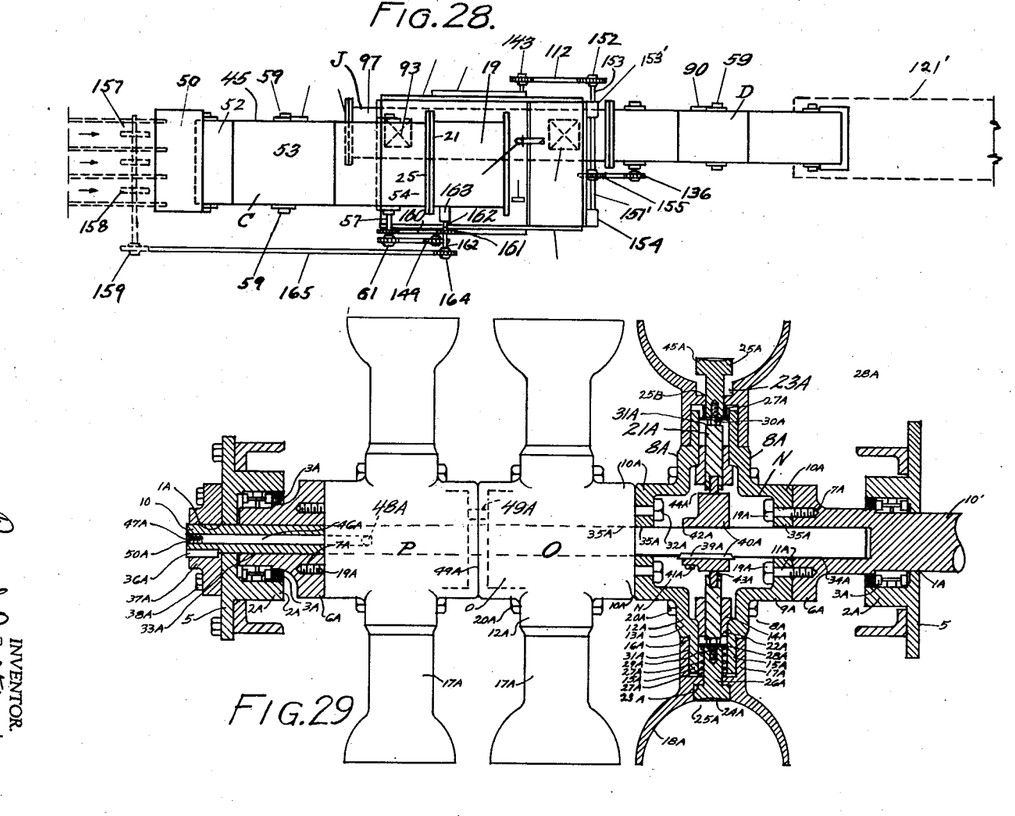
Fig. 28 is a top plan view partly in dotted lines of the apparatus.
Fig. 29 is a longitudinal fragmentary sectional and partly in dotted outline view of one of the drum and shaft assemblies taken on the line 29—29 of Fig. 11 looking in the direction of the arrows.

With reference to Fig. 29 which illustrates a longitudinal fragmentary sectional and partly in dotted outline view taken on the line 29—29 (Fig. 11) looking in the direction of the arrows. The horizontal side members 5 are formed with a pair of horizontally aligned openings 1A and on the inner surface surrounding said openings with the annular flanges 2A adapted to house the roller or ball bearings 3A. Extending through one of the openings 1A is the drive shaft 10' and through the other opening 1A is the similar shaft 9' on the free ends of which shaft are keyed or otherwise mounted the respective sprockets or pulleys 4A and 5A which are driven by belts 148 and 146, respectively. Since each of the shaft and drum assemblies is identical, for brevity of description only one will be described in detail.

The rotatable shaft 10' is formed at its inner end with a lateral flange 6A and having in its end face a series of countersunk threaded openings 7A. A series of interconnected drum structures N, O, and P are adapted to be connected to and constitute in effect a continuation of shaft 10', and one of which, since they are identical, will now be described in detail. Said drum N includes the complemental sections 8A each having a hub portion 9A formed with an end 10A having an annular series of openings 11A. Said hubs at equispaced circumferential points are formed with the radially extending semicircular spoke elements 12A thickened at 13A forming the inner shoulder 14A and extending outwardly constituting the reduced semi-annular cup stem engaging end portions 15A forming the outer shoulder 16A on which are adapted to seat the hollowed out stem 17A of fruit cup 18A when said cup is operatively positioned. One end of drum N is secured to the flanged end 6A of shaft 10' by the threaded stud bolts 19A, and the complemental sections 8A are secured together by suitable bolts 20A. Said bolts are positioned so as not to interfere with the reciprocating movement of cam follower 21A mounted in bearing plug 22A positioned intermediate the thickened portions 13A. The cup 18A is countersunk as at 23A and in which seats head 24A of the fruit ejector 25A, and from which, stem 26A extends downwardly within the space formed by the portions 15A. Mounted on the stem 26A is a coil or compression spring 27A one end of which seats against the bottom of the hollowed out stem 17A and the other against washer 28A secured to the end of stem 26A by stud bolt 29A threadedly extending in said stem and the head 30A of which engages the end of follower 21A normally positioned as shown at 31A.

Attached to the drum N just described and secured to the shaft 10' in longitudinal alignment, in the present instance, are the drums O and P, respectively, said drums being attached to drum N and to each other by bolts 32A. While in this instance there are shown three interconnected drums, it is to be understood that the number may be varied according to operating requirements. A rotatable stub shaft section 33A is journaled in ball or roller bearings 3A mounted in the flange housing 2A of horizontal member 5 at the opposite side of the machine from shaft 10' and which shaft is formed at its inner end with a flange 6A and threaded openings 7A and secured to drum P by stud bolts 19A similar to shaft 10' heretofore described.

The inner end of shaft 10' has a countersunk bore 34A and each end 10A of the drums N, O, and P are formed with corresponding openings 35A adapted to register with said countersunk opening 34A in which openings and countersunk bore is mounted the stationary shaft 10 keyed as at 36A to cap plate 37A secured to horizontal member 5 by stud bolts 38A. Mounted on said shaft 10 and secured against rotative movement central of the drums N, O, and P by key 39A is a stationary cam 40A secured against longitudinal movement by set screw 41A extending through the flange extension 42A, and adapted to travel over said cam is the cam roller 43A of follower 21A.

The juice is extracted from the fruit when the respective cups 18A are at the low point in their rotative movement, and when they pass upwardly through an angle of about 45 degrees the waste is adapted to be ejected from the cups, and therefore at this point is located the high point of cam 40A, as at 44A, and which through the instrumentality of roller 43A and follower 21A, ejector 25A is moved to ejecting position as shown at 45A against the action of spring 27A, as will be hereinafter more fully explained.

As initially the machine with special reference to chamber E is filled with hot water or other sterilizing fluid surrounding the shaft and drum assemblies including the fruit cup and ejector mechanisms, and in order that no water may reach the interior of the drums through the ejector operating openings 25B when the ejectors are in the position shown at 45A, and so that no air may remain in the drums when the water in the machine has been displaced by said inert gas, the stationary shaft 10 is formed with a gas conduit 46A having an inlet opening at 47A, an outlet in drum P as at 48A, interconnecting passages between drums P and O as at 49A and similarly between drums O and N, so that during the initial filling of the machine with water inert gas may be suitably admitted at 47A under pressure for distribution through the respective drums and thereby forcing all air from these drums through the ejector mechanisms 25A when in extended position as at 45A, and preventing the entrance of water therethrough, said gas pressure being maintained until all of the water within said chamber E has been displaced by the inert gas through the primary gas feed line 40 to said machine, and at which time the similar gas supply to 46A is cut off, that is, during the normal operation of said machine, and until it is again desired to fill it with water as in the first instance. The inlet end 47A of the gas conduit 46A may be internally threaded as at 50A for connection with a suitably controlled gas connection (not shown), as will be well understood.

*Fluid seal delivery conveyor*

The fluid seal delivery conveyor C (Figs. 1 and 2), now to be described, is adapted to deliver the fruit from a source of supply to the hermetically sealed juice extracting gas filled chamber E through what may be a sterilizing fluid *b* forming an air seal for said chamber, the conveyor being so constructed as to form what may be considered an atmospheric pressure section *c*, a fluid containing section *d*, and a gas section *e*, so that the pressure in the gas section may be adjusted relative to the atmospheric pressure prevailing in the atmospheric section to provide on opposite sides of a suitably arrange partition or dividing plate 44 the water levels *f* and *g*, respectively, indicated in dotted lines (Figs. 2 and 4), and whereby the exterior of the fruit is sterilized as it is conveyed through said fluid and delivered therefrom to the oxygen free juice extracting chamber E without exposure to contamination, as will directly more fully appear.

The outer casing 45 of conveyor structure C is substantially V-shaped and is supported, in the present instance, on the stool-like frame structure F comprising spaced pairs of legs 46 bent or otherwise formed at their upper ends to provide the curved seats 47 conforming to the shape of the lower end of said casing, said legs being suitably connected by cross bars 48. Casing 45 is formed at its fruit receiving end with a substantially lateral flange 49 on which is adapted to seat the removable plate 50 detachably secured by fastening elements 51 for a purpose directly appearing. The top of casing 45 is constructed with a portion 52 extending downwardly in parallelism with the corresponding bottom portion, a central horizontal portion 53, and an upwardly and downwardly inclined portion 54 forming the discharge end $a$ terminating in the vertical flange 25. Said end $a$ when secured as hereinbefore described forms with hood 19 a sealed discharge connection between conveyor C and the extractor unit B, as will be apparent. Casing 45 is provided adjacent its lower end with a cleanout door or plate 55 secured by fastening elements 16, and the depending dividing plate or partition 44 is suitably secured to the under surface of top section 53 of said casing, as will be well understood.

Mounted in the casing 45 (Fig. 2) and adjacent the inlet end, the discharge end, and the lower end, are a trio of shafts 56, 57, and 58 journaled in cap bearings 59 mounted exteriorly of said casing and secured by fastening elements 60, excepting that shaft 57 at one end extends through its bearing 59 and has suitably keyed or otherwise mounted on its free end drive pulley or sprocket 61. Mounted on opposite sides of said casing vertically spaced above shaft 58 and mounted in similar bearings 59 are stub shafts 62 on the free ends of which are suitably mounted sprocket wheels 63. Mounted interiorly of the casing and adjacent opposite sides thereof on the shafts 56, 57, and 58 are the sprocket wheels 64 over which latter wheels and under sprocket wheels 63 are adapted to travel the endless sprocket chains 65, said chains having inserted in predetermined and equi-spaced relation anchor links 66 (Figs. 6 and 7) having extensions 67 to which are secured by bolts 68 the ends of the respective separator members 69. Sprocket chains 65 are formed with suitable sprocket openings 70. Suitably mounted on said separator elements and projecting normally from the outer surface thereof are a plurality of fruit engaging fingers 71. Suitably secured to the inner bottom surface of casing 45 by welding, riveting, or otherwise, are, in the present instance, four vertical partitions 72 (Fig. 5) positioned to form three fruit channels 73 in each of which are adapted to extend from the bottom stretch of the endless conveyor G a trio of fingers 71 for conveying the fruit in proper feeding order from the inlet to the outlet of the conveyor through the sterilizing fluid, the order of the feeding being timed with the operation of the extracting mechanism, as will hereinafter appear.

While the fingers 71 are shown as mounted in alignment on separator element 65, it will be understood that the middle finger of each group adapted to project in the channel 73 may be rearwardly offset with respect to the outer fingers; also, the number may be varied so that the groups traveling in a respective channel may be alternately staggered, if desired.

A pair of L-shaped track members 74 (Fig. 2) curved downwardly at their ends, adapted to prevent sagging of the lower stretch of the endless chains 65, are mounted on the respective inner sides of casing 45 equi-spaced throughout their length from the bottom of said casing and secured similar to partition 73 or in any suitable manner. For the purpose of confining the fruit within the channels 73 in the course of its travel through fluid $b$ there is mounted between the stretches of the endless conveyor G a V-shaped confining plate 75 welded or otherwise secured to the track members 74.

It will be noted with respect to the end portion $a$ (Fig. 2) of conveyor C that the casing 45 extends downwardly terminating in flanges 24 secured to frame sections 3, and mounted within said casing is an auxiliary bottom section 76 constituting a continuation of the bottom of casing 45, from a point 77 to 78 and then downwardly at an incline to 79 to form with partitions 72 continuations of channels 73 so that from point 78 the fruit will be delivered by gravity through said hood 19 to the juice extracting mechanism within chamber E in timed operative relation therewith.

*Combined water supply, venting and overflow unit*

Figure 1:
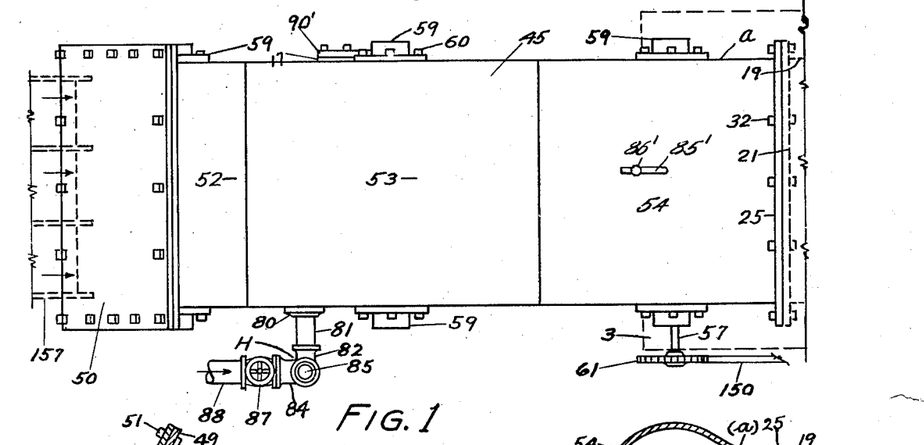
Fig. 1 is a top plan view of the fluid seal delivery conveyor and fluid supply, venting and overflow unit.

In order to initially fill the machine completely with hot water or other sterilizing fluid to sterilize the machine, displace the air therein, and also to control the predetermined quantity of fluid in conveyor C and provide an air lock for the extractor chamber E, there is mounted on the side of and communicating with the interior of casing 45 of conveyor C, a combined water supply, venting and overflow unit H, now to be described (Figs. 1 and 4).

Suitably secured to the side of casing 45 adjacent the lower end of dividing plate 44 is a mounting 80 through which extends and is adapted to be supported thereby, one end of nipple 81, the remaining parts of unit H comprising lower T-section 84, vent pipe 85, vent pipe control valve 86, water or fluid supply control valve 87, water or fluid supply line 88, and overflow and drain pipe 89, suitably interconnected as clearly shown in Figs. 1 and 4 of the drawings. It will be further noted that the overflow pipe 89 extends upwardly through T-section 82, plug element 90 by which it is supported, and within nipple 83, with its upper end normally coincident with water level $f$ which level said end determines. The overflow pipe 89 has mounted therein control valve 89' for use when initially filling the machine with water. Also suitably mounted at the apex of portion 54 of conveyor C is a vent pipe 85' having control valve 86' adapted to be opened during the initial filling of the machine with water and closed when all of the air has been exhausted from the apparatus and said conveyor above the fluid seal.

The overflow pipe 89 being smaller than the interior dimensions of T-section 82 and nipple 83, a water or fluid space around said pipe is provided, on which column of water air is permitted to act through the normally open vent pipe 85, and whereby atmospheric pressure in section $c$ is maintained.

Figures 2, 3:
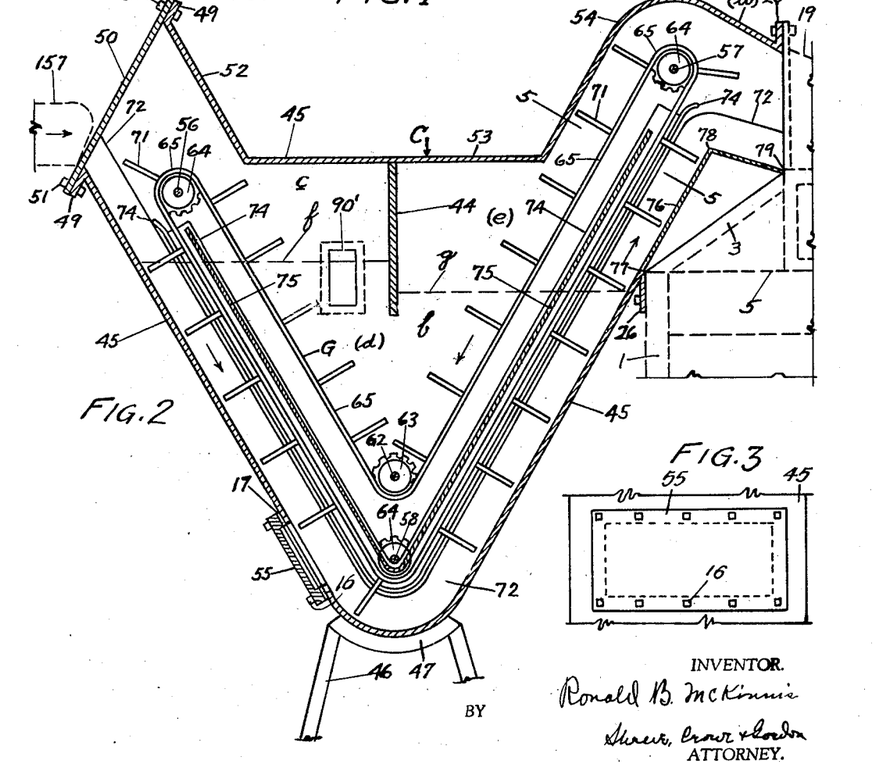
Fig. 2 is a longitudinal section through Fig. 1.
Fig. 3 is an elevation of the clean out door and portion of the conveyor casing.
Figure 27:
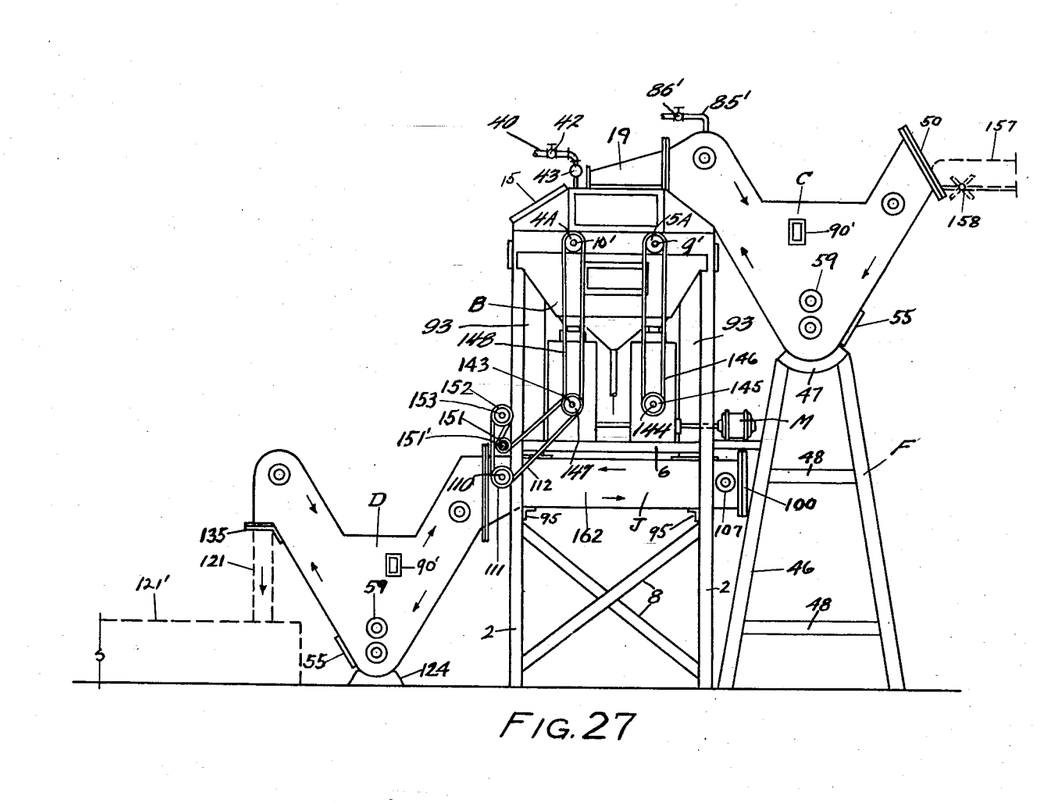
Fig. 27 is a rear side elevation of Fig. 26.

A window 90' similar to the window construction heretofore described in connection with plates 14 and 32 of chamber E, or in any suitable manner, is provided in the side of casing 45 as shown in Figs. 2 and 27, and its size and position may be varied as desired so that not only the travel of the fruit may be observed but also the relative water levels on opposite sides of dividing plate 44.

As in machines of this general type insofar as the juice extracting mechanism is concerned, in the present instance mounted in the oxygen free chamber E, and as shown in the Faulds patents heretofore referred to, such mechanism comprises a pair of intermittent rotatable cup drums adapted to rotate by Geneva motion in opposite directions and having series of fruit carrying cups. The fruit passes over a cutting mechanism (not shown) so that when the cups reach the bottom of their rotative movement, the half of the fruit carried by the respective cups is positioned over suitable plungers or presser heads which are impelled upwardly during the momentary halting of the drums, pressing the juice from the fruit, and as the heads recede the cups continue upwardly through an angle of approximately 45° at which points, in the present instance, at opposite sides of chamber E, a cam operated ejector mechanism, hereinafter to be described, expels the rinds, pulp, seeds, etc., from the cups, which for brevity of description will hereinafter be referred to as hulls, and the mechanism for catching and conveying them from the extractor chamber E will now be described.

Hull receiving and conveying mechanism

Figure 15:
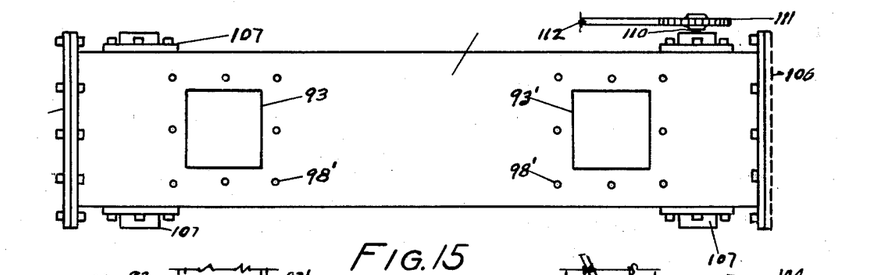
Fig. 15 is a top plan view of the horizontal hull conveyor.
Figure 16:
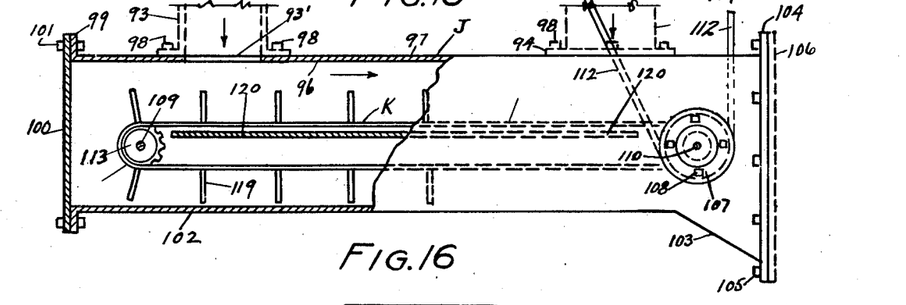
Fig. 16 is a side elevation of Fig. 15 partly in section illustrating a portion of the endless conveyor, and portions of the drive and chutes in dotted outlines.

Suitably mounted in chamber E at each end underlying the points at which the hulls are ejected from the cups is a hull receiving hopper 91 (Fig. 10) having an inclined bottom 92 extending from the front side of the chamber adjacent standards 1 downwardly toward the rear side from which points the upper end of chutes 93 suitably connected thereto extend through suitable openings air sealed to the outer atmosphere and downwardly adjacent standards 2 terminating in lateral flanges 94. Mounted beneath said chutes 93 is the horizontally disposed hull conveyor J (Fig. 15) suitably supported on angle bars 95 connected at one end to standards 1 and at the other end to standards 2. The flanges 94 of chutes 93 are connected to the top 96 of the rectangular casing 97 of conveyor J by fastening elements 98 extending through openings 98' so that said chutes will register with openings 93'. The left hand end of said casing 97 is formed with a lateral flange 99 (Fig. 16) to which is connected the detachable end plate 100 by bolts 101 whereby access may be had to the interior of said casing for cleaning or other purposes. Said conveyor J extends beyond each end of unit B and at its discharge end the bottom 102 of said casing is formed with an inclined portion 103, said end terminating in lateral flange 104 adapted to be connected by bolts 105 to the complemental flange 106 of the fluid seal hull discharge conveyor D as will hereinafter more fully appear.

Mounted in casing 97 and journaled in cap bearings 107 secured to the exterior of the casing by fastening elements 108 are shafts 109 and 110, the latter projecting beyond the casing 97 of conveyor J and has suitably mounted thereon sprocket or pulley wheel 111 over which travels belt 112 for driving said conveyor J, as will directly more fully appear.

Figures 17, 18:
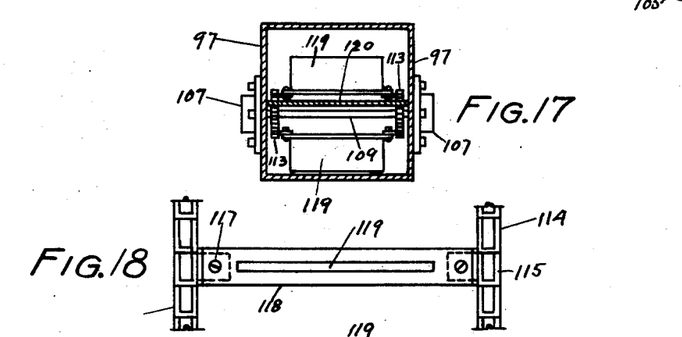
Fig. 17 is a cross section taken on the line 17—17 of Fig. 16.
Fig. 18 is a top plan view of the separator member and conveyor blade and portions of endless conveyor chains.
Figure 19:
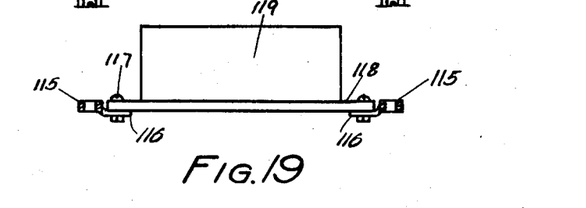
Fig. 19 is a side elevation of Fig. 18 with the separator attaching links partly in section.

Mounted on shafts 109 and 110 within the casing and adjacent its opposite sides are sprocket wheels 113 over which are adapted to travel the endless sprocket chains 114, which are similar to sprocket chains 65 heretofore described, said chains having inserted in predetermined and equi-spaced relation anchor links 115 having extensions 116 to which are secured by bolts 117 the ends of the respective separator members 118; said separator members 118 are similar to sparators 69 heretofore described in connection with conveyor C except they have longitudinally secured thereto and extending at right angles therefrom the solid conveyor blades or plates 119 (Fig. 17). Mounted intermediate the upper and lower stretches of the endless conveyor chain structure K and underlying the upper stretch of said endless conveyor is a horizontal plate member 120 welded or otherwise suitably secured to the opposite walls of casing 97 and extending substantially from shaft 109 to 110 and which also underlies and is adapted to catch the hulls from chutes 93 and over which they are conveyed by blades 119 to the discharge end of said conveyor where they are delivered to the fluid seal hull discharge conveyor D, as will directly more fully appear.

Fluid seal hull discharge conveyor

Figures 20, 21:
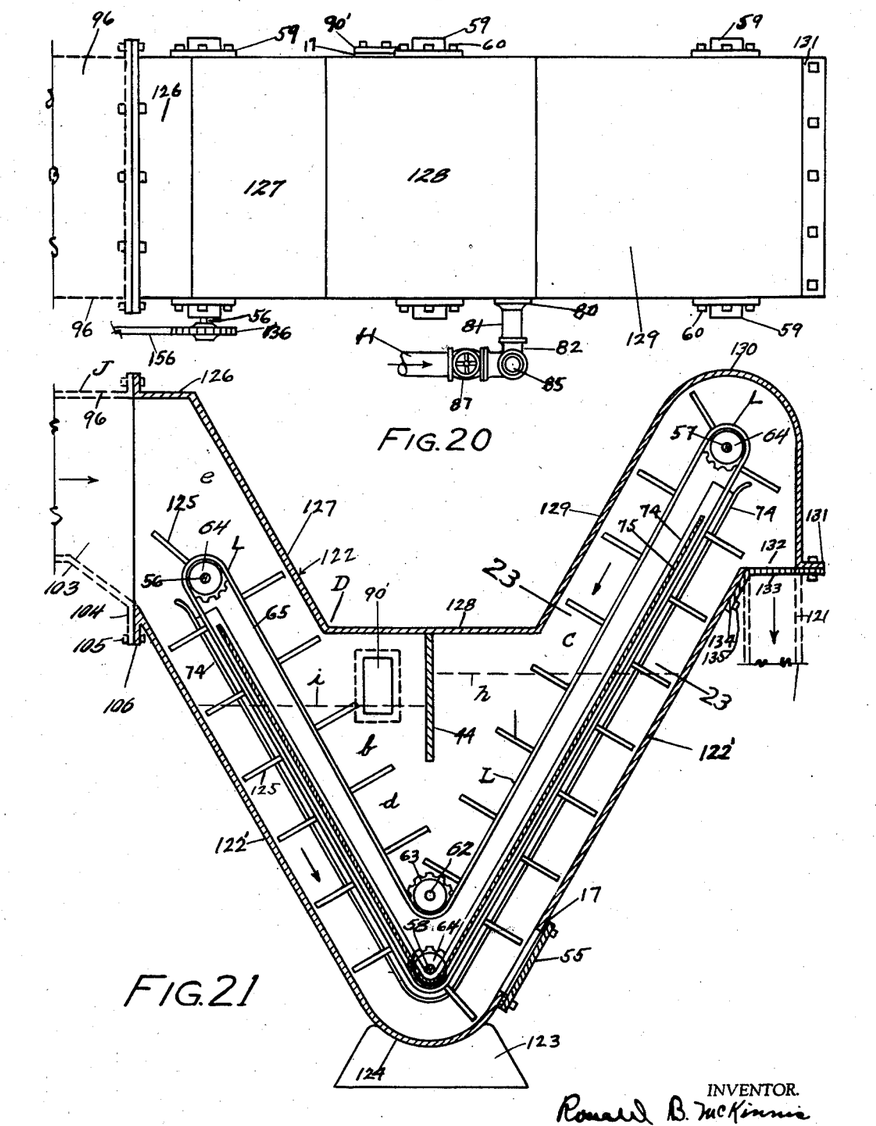
Fig. 20 is a top plan view of the fluid seal discharge conveyor and fluid supply, venting and overflow unit.
Fig. 21 is a longitudinal section through Fig. 20.

This conveyor D (Figs. 21 and 22) is substantially similar to the delivery conveyor C except that its conveyor operation is reversed and it is adapted to convey portions of the fruit from which juice has been extracted or hulls from hull conveyor J to a vertical chute 121 or other suitable receptacle for receiving the hulls, through fluid b forming an air seal for the discharge end of said hull conveyor J, the conveyor being so constructed as to form an atmospheric pressure section c, a fluid containing section d, and a gas section e communicating with said hull conveyor, so that the pressure in the gas section may be adjusted relative to the atmospheric pressure prevailing in the atmospheric section to provide on opposite sides of a suitably arranged partition or dividing plate 44 the water levels h and i maintained in a manner similar to the levels f and g, as heretofore described in connection with conveyor C.

The outer casing 122 is substantially V-shaped and supported in the present instance on a saddle support or block 123 hollowed out to conform to the configuration of the lower end of said casing as at 124. Said casing 122 is formed with flange 106 for connection with flange 104 of hull conveyor J, the bottom of said casing 122 forming in effect a continuation of portion 103 so as to deliver the hulls to the conveyor blades 125.

The top of casing 122 (Figs. 20 and 21) is constructed with a portion 126 extending in alignment with top 96 of hull conveyor J, a portion 127 extending downwardly in parallelism with the corresponding bottom portion 122', a central horizontal portion 128, a portion 129 extending upwardly in parallelism with its corresponding bottom portion to a point 130 and in substantially the same horizontal plane as 126, thence downward terminating in the lateral flange 131. The bottom 122' terminates at a point opposite to flange 131 thereby forming a discharge opening 132 adapted to be closed during the initial filling of the machine with water or other fluid by the detachable plate 133 having a depending portion 134 secured to bottom portion 122' and flange 131 by fastening elements 135, said plate adapted to be removed after the machines have been freed from air or sterilized as heretofore described. Similarly positioned and secured to the under surface of section 128 is a dividing plate similar to that described in connection with conveyor C.

Figures 22, 23, 24, 25:
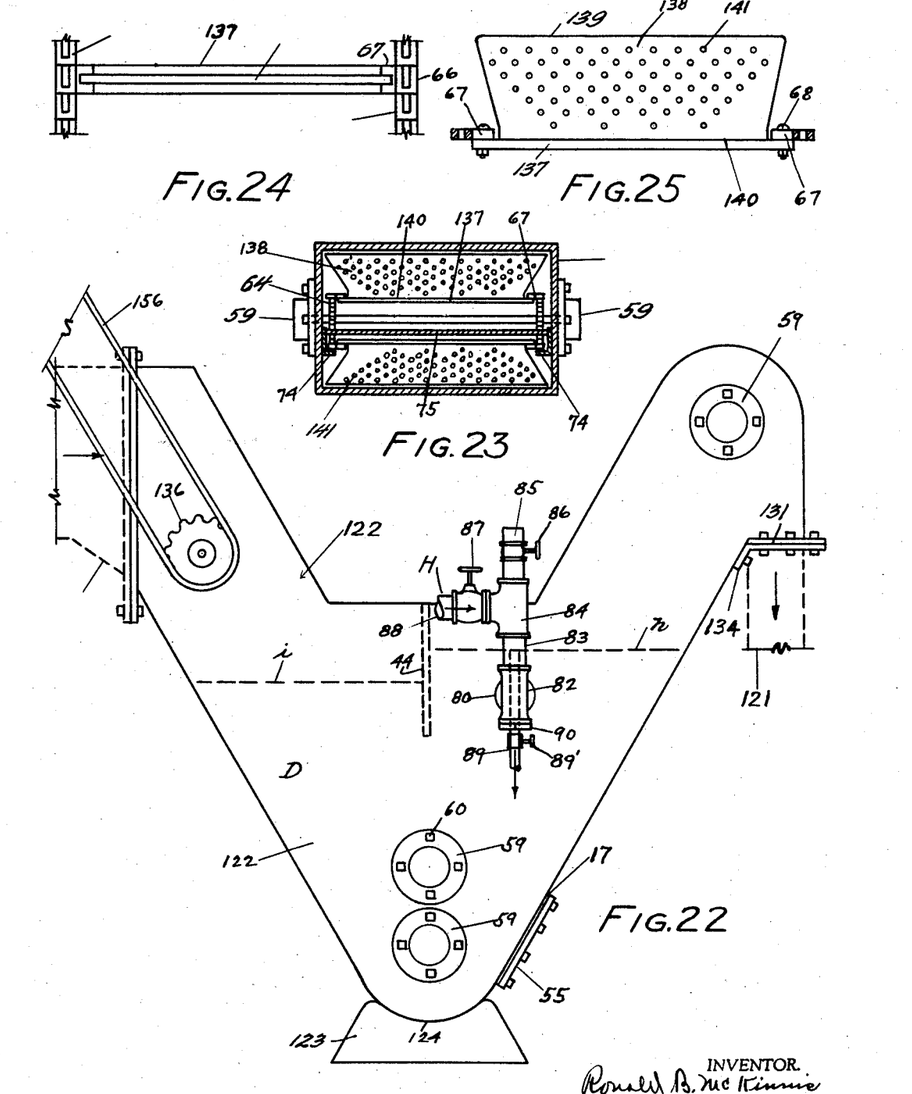
Fig. 22 is a side elevation of the discharge conveyor and the fluid supply, venting and overflow unit.
Fig. 23 is a cross section taken on the line 23—23 of Fig. 21.
Fig. 24 is a top plan view of one of the separator members, conveyor blades and portions of the endless conveyor chains.
Fig. 25 is a side elevation of Fig. 24 with the separator attaching links of the endless chains partly in section.

The conveyor mechanism within the casing 122 is substantially similar in construction and operation to that described in connection with conveyor C and comprises a trio of shafts 56, 57, and 58 journaled in cap bearings 59 secured by fastening elements 60, except in this instance, shaft 56 at one end extends through bearing 59 and has suitably mounted thereon drive pulley or sprocket 136 for driving said conveyor mechanism, instead of shaft 57 as heretofore described. Mounted on opposite sides of said casing vertically spaced above shaft 58 are sprocket wheels 56 as heretofore described. Mounted on shafts 57 and 58 are sprocket wheels 64 over which latter wheels and under sprocket wheels 63 travel the endless sprocket chains 65 having spaced anchor links 66, to the extensions 67 of which are secured by bolts 68 the ends of the respective separator members 137 (Figs. 23 and 24). Said separator members 137 are similar to separators 69 described in connection with conveyor C except they have longitudinally secured thereto and extending at right angles therefrom the conveyor blades or plates 125, in the present instance, wider at their free edges 139 than the edge 140 suitably secured to said separator members 137. Said blades 125 (Fig. 25) are perforated substantially throughout as at 141 so as not to carry the water or fluid $b$ from the conveyor, as will be well understood.

Mounted in casing 122 similar to conveyor C and similarly functioning are a pair of L-shaped track members 74 and a confining plate 75 mounted between the stretches of the endless conveyor L, as will be apparent.

Casing 122 as in the case of conveyor C, is provided with a window 90' and with clean out door 55.

*Combined water supply, venting and overflow unit*

This unit, mounted on the fluid seal hull discharge conveyor D, is exactly alike in construction and function to the similar unit H described in connection with conveyor C, and comprises mounting 80, nipple 81, T-section 82, nipple 83, T-section 84, vent pipe 85, vent pipe control valve 86, water or fluid control valve 87, fluid supply line 88, overflow and drain pipe 89, overflow control valve 89', and drain pipe supporting means 90, and it is therefore not deemed necessary to describe this unit H in detail.

*Driving assembly*

Figure 26:
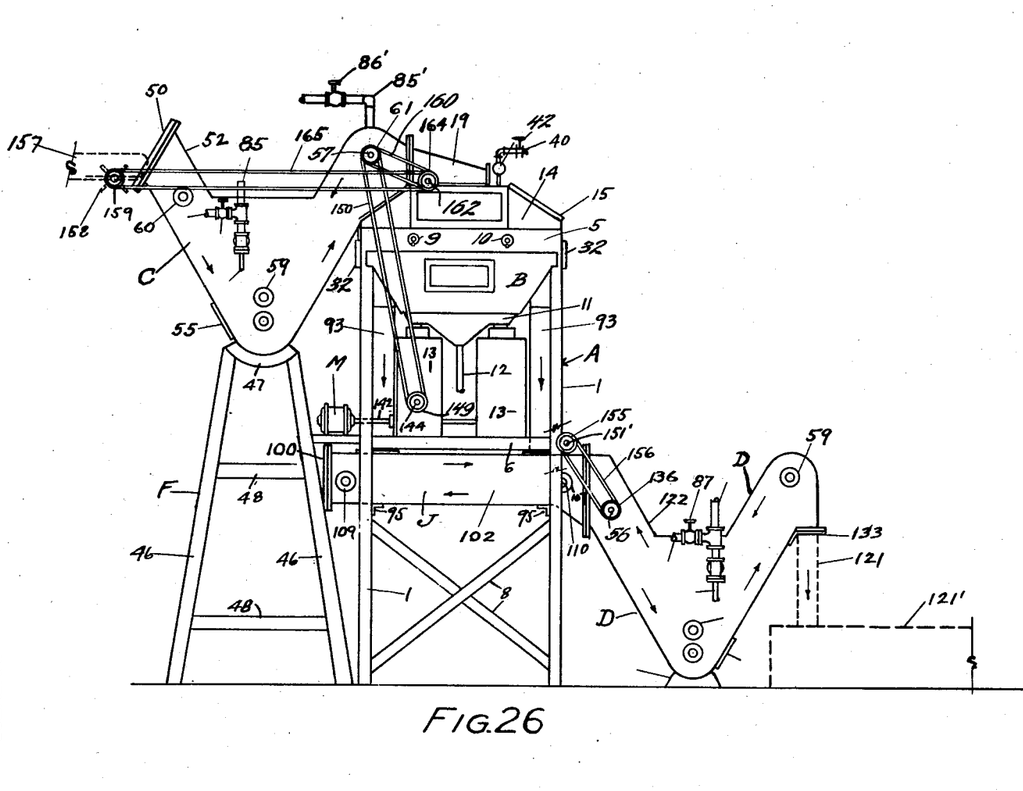
Fig. 26 is a partly diagrammatic front side elevation of the apparatus and showing driving connections.

The driving connections and chain of drive from the motor M will now be described (Figs. 26, 27 and 28).

The drive from motor M is through shaft 142 which is suitably journaled in casings 13 through suitable screw mechanisms (not shown) to shafts 143 and 144 (Fig. 27) mounted in said casings at right angles to shaft 142. From shaft 144 (Fig. 27) through pulley 145 mounted thereon, belt or chain 146, sprocket 5A to shaft 9'; and from shaft 143 through sprocket or pulley 147 mounted thereon, belt or chain drive 148, pulley 4A to shaft 10'. The shafts 9' and 10' effect rotation of the fruit cup drum mechanism N, O, and P (Fig. 29), and from shaft 144 through front pulley 149 (Figs. 26 and 28), belt 150, pulley 61 and shaft 57 driving the endless conveyor G of conveyor C.

From shaft 143 the drive is through rear sprocket or pulley 147 (Figs. 27 and 28), belt 112, pulley 151, shaft 151', idler 152, stub shaft 153 mounted in suitable bearings 153', and from idler 152, through belt or chain 112, pulley or sprocket 111, to shaft 110, which drives the endless conveyor K of hull conveyor J, and belt 112 back to pulley 147. Shaft 151' mounted in bearings 154 also drives through front sprocket 155 (Figs. 26 and 28), chain 156, sprocket 136 and shaft 56 which drives the endless conveyor structure L of the hull discharge conveyor D.

A conveyor mechanism of conventional construction for facilitating the feed of the fruit from a source of supply to the fluid seal delivery conveyor C may be employed, shown in dotted lines as at 157 (Fig. 26) and including a paddle wheel structure 158 and pulley 159 and adapted to operate in three channels corresponding to channels 73 (Fig. 5), the feeding operation of which is timed in accordance with that of conveyor G and the fruit cup mechanism in chamber E. Said mechanism 158 is driven in any suitable manner, but in the present instance, from shaft 57 through double pulley 61, belt or chain 160, pulley or sprocket 161 (Figs. 8 and 28), shaft 162 journaled in bearings 163 suitably mounted on the top 18 of chamber E, and from sprocket 164 mounted on the free end of shaft 162, through belt 165 to pulley 159. Instead of by belt 160, shaft 162 may be driven from the conventional Geneva gear assembly mounted on shafts 9' and 10' (not shown) if desired.

*Operation*

The operation of my improved fruit and vegetable juice extracting apparatus, wherein the substantially original sterile and anaerobic condition and natural flavor of the juice will be retained during and following its extraction, would seem to be clear from the above description; however, it might be well to state further as follows:

In order to carry out my method of extraction, and under the requisite conditions to retain and preserve the vitamin content and natural flavor of the juice, it is necessary to proceed by first securing the seal conveyor end plates 50 and 133 in sealing position, then close drain valve 12' and the overflow valves 89' and open vent valves 86—86' and the hot water or other fluid supply valves 87 to effect sterilizing and filling of the apparatus with said fluid; at the same time admit the inert gas under pressure through conduit 46a to the drums P, O, and N so as to force all air therefrom and prevent the entrance therein of any water through the structure surrounding the extended ejectors 25a. Close vent valve 86 of conveyor D when water flows from vent pipe 85, and when the entire apparatus from the seal discharge conveyor D to the delivery conveyor C has been completely filled with water so that water flows from vent pipe 85 of conveyor C, close supply valves 87, open overflow valves 89', close vent valve 86 and then 86' of conveyor C, and at the same time open drain valve 12' and gas valve 41 so that the inert gas under pressure is admitted to and adapted to fill chamber E as the water is displaced. The withdrawal of the water and introduction of the gas can be relatively controlled as indicated by the pressure gauge, by opening of the vent valves to effect and maintain the atmospheric and gas pressure differential as indicated by the water levels in dotted outlines at $f$ and $g$ in the fluid seal conveyor C and $h$ and $i$ in the fluid seal conveyor D, as hereinbefore described. When the water in the apparatus has been completely displaced by the inert gas from the water level g at one side of the apparatus (Figs. 2 and 4) to i at the other side (Figs. 21 and 22), the flow of gas to inlet 47a of conduit 46a may be cut off and the end cover plates 50 and 123 removed whereupon the apparatus is ready for operation.

Starting of motor M effects operation of the various components of the apparatus as hereinbefore described. The feeding operation of paddle wheel 158, delivery endless conveyor G, and the series of cups 18a are timed so that three fruit are simultaneously delivered successively to the fingers 71 of each separator 65 by which they are conveyed through the sterilizing fluid b for successive delivery to the cup and stationary knife mechanism (the latter not shown), so that one half of each fruit is conveyed to the lowest point in its rotative cycle where the drum and cup mechanisms are held stationary by suitable Geneva gear mechanisms (not shown) for a sufficient time for the presser head mechanisms to press or extract the juice from the fruit held in said cups, and when the latter have moved in opposite directions through an angle of substantially 45° cam 40a through follower 21a moves ejector 25a outwardly ejecting the hulls or waste from the cups into hoppers 91 from which it passes through chutes 93 to the horizontal conveyor J for delivery to the endless discharge conveyor L by which it is conveyed through the fluid seal b and to the discharge chute 121 and to any suitable receptacle or the like, such as 121'.

The juice as it is extracted as above described within the oxygen free gas chamber E, and at a pressure slightly above atmospheric, is collected in pan 11 from which it is drawn off through drain pipe 12 and suitable controlled valve 12 or cut off mechanisms to and sealed in oxygen free containers, so that the condition of the juice will be maintained in substantially its original natural, sterile, bacteriological condition without loss of flavor or vitamin content until used, as will be well understood without further discussion.

It will be apparent from the above description that I have evolved a method and apparatus for extracting and delivering to suitable containers fruit and vegetable juices under non-oxidizing conditions so that there will be no impairment of their natural flavor, aroma, and vitamin content, said apparatus being so constructed that the pretreatment of the whole fruit and the extraction and collection of the juice is effected entirely within the apparatus, thereby eliminating any chance of contamination, said apparatus being compact in form, simple in construction, manufacturable and operable at a reasonable cost, and efficient for the purposes intended.

Although in practice it has been found that the form of the invention illustrated in the accompanying drawings and referred to in the above description as the preferred embodiment is the most efficient and practical, yet realizing the conditions concurrent with the adoption of the invention will necessarily vary, it is well to emphasize that various minor changes in details of construction, proportion and arrangement of parts, may be resorted to within the scope of the apperded claims without departing from or sacrificing any of the principles of this invention.

Having thus described the invention, what is desired protected by Letters Patent is as set forth in the following claims:

1. A method of extracting fruit juice, consisting in extracting the juice in a juice extracting chamber containing an inert gas, sealing the chamber with a liquid seal, and delivering the fruit to the extracting chamber through said seal.

2. A method of extracting fruit juice, consisting in filling a juice extracting chamber with a liquid, replacing the liquid with an inert gas under pressure to form a non-oxidizing atmosphere within the chamber, forming a fruit delivery path to the chamber, intercepting the path with a liquid seal, and then delivering the fruit to the chamber through the seal.

3. A method of extracting fruit juice, consisting in filling a juice extracting chamber with a sterilizing liquid, replacing the liquid with inert gas under pressure to form a non-oxidizing atmosphere within the chamber, forming a fruit delivery path to the chamber, intercepting the path with a sterilizing liquid seal, then delivering the fruit to the chamber through the seal.

4. A method of extracting fruit juice, consisting in, filling a juice extracting chamber with a liquid, replacing the liquid with an inert gas under pressure to form a non-oxidizing atmosphere within the chamber, forming a fruit delivery path to the chamber, intercepting the path with a liquid seal, then delivering the fruit to the chamber through the seal, extracting the juice from the fruit within the non-oxidizing chamber, removing the waste through a liquid seal path communicating with the chamber, and collecting the juice under non-oxidizing conditions.

5. A process for extracting juice from fruits and vegetables comprising passing the starting material with its natural outer covering in place through a liquid seal to a chamber where the juice is extracted in the presence of an inert gas at greater than atmospheric pressure and discharging the waste through a seal preventing access of oxygen to the extracting chamber.

6. A process for extracting juice from fruits and vegetables comprising passing the starting material with its natural outer covering in place through a sterilizing liquid seal to a chamber where the juice is extracted in an inert atmosphere, removing the juice in substantially non-oxidized condition from the chamber, and removing the hulls separately from the juice without permitting access of oxygen to the extracting chamber.

7. A process for extracting juice from fruits and vegetables comprising passing the starting material with its natural outer covering in place through a liquid seal to a chamber where the juice is extracted under in an inert atmosphere at greater than atmospheric pressure, removing the juice in substantially non-oxidized condition from the chamber, and removing the hulls separately from the juice through a liquid seal.

8. In extracting juice from fruits and vegetables, passing the starting material through a liquid seal to an extracting chamber filled with inert gas and then extracting the juice from such starting material.

9. A process for extracting juice from fruits and vegetables comprising passing the starting material with its natural outer covering in place through a liquid seal to a chamber filled with inert gas where the juice is extracted and then removing the waste through a liquid seal.

10. A process for extracting juice from fruits and vegetables comprising passing the starting material with its natural outer covering in place through a liquid seal to a chamber filled with inert gas where the juice is extracted, removing the juice in substantially non-oxidized condition from the chamber, and removing the hulls through a liquid seal without permitting access of oxygen to the extracting chamber.

11. A method of treating fruit, consisting in delivering the fruit through a liquid seal to a fruit juice extracting step in the presence of an inert gas and discharging the waste from the juice extracting step through a liquid seal.

12. A method of extracting fruit juice consisting in delivering the fruit to an extracting chamber through a liquid seal, extracting the juice from the fruit in an atmosphere of inert gas in the extracting chamber, and separately collecting the extracted juice and the waste in the presence of an inert gas.

RONALD B. McKINNIS.